United States Patent [19]
Yoshinaga

[11] 3,971,622
[45] July 27, 1976

[54] MICROSCOPE ASSEMBLY HAVING BASE MOUNT FOR RECEIVING DIMMER CIRCUIT COMPONENTS

[75] Inventor: Makoto Yoshinaga, Fuchu, Japan

[73] Assignee: Olympus Optical Co., Ltd., Tokyo, Japan

[22] Filed: Oct. 24, 1974

[21] Appl. No.: 517,486

[30] Foreign Application Priority Data
Dec. 13, 1973 Japan............ 48-141328[U]

[52] U.S. Cl. ............................. 350/87; 240/2 MA
[51] Int. Cl.² ........................................... G02B 21/06
[58] Field of Search ................. 240/2 MA; 350/87; 315/DIG. 4; 317/117, 119

[56] References Cited
UNITED STATES PATENTS

| | | | |
|---|---|---|---|
| 2,503,389 | 4/1950 | Host | 240/2 MA |
| 2,691,918 | 10/1954 | Robins et al. | 350/87 |
| 2,730,923 | 1/1956 | Gorham et al. | 240/2 MA |
| 2,863,989 | 12/1958 | Wrigglesworth | 350/87 |
| 2,945,174 | 7/1960 | Hetzler | 317/119 |
| 3,300,711 | 1/1967 | Duncan | 315/DIG. 4 |
| 3,382,413 | 5/1968 | Gandhi et al. | 317/119 |

Primary Examiner—Harold A. Dixon
Attorney, Agent, or Firm—Ostrolenk, Faber, Gerb & Soffen

[57] ABSTRACT

A base mount for a microscope includes means for carrying the electrical components of a microscope base mount for a dimmer. The mount is separable from the body of an associated microscope and is adapted to be fixedly attached thereto, thus facilitating the assembling and servicing of the electrical components.

2 Claims, 2 Drawing Figures

MICROSCOPE ASSEMBLY HAVING BASE MOUNT FOR RECEIVING DIMMER CIRCUIT COMPONENTS

BACKGROUND OF THE INVENTION

The invention generally relates to a microscope with a dimmer which is associated with a light source used for the purpose of illumination in the microscope.

Microscopes having a dimmer for adjusting the intensity of illuminating light are already known, and the recent trend is to introduce a dimmer incorporating a thyrister, such as an SCR, a silicon controlled rectifier element, etc., so that the brightness of the light source may be adjusted in a continuous manner. The prior practice to install such electrical components used in the dimmer and/or associated circuit has been to mount these components directly in the interior volume of the base of the microscope in spite of the degree of complexity involved. Thus the individual components are mounted in the interior volume of the base one by one while the base is held in an inverted position. This type of base mounting is cumbersome and a disadvantage in the mass production of microscopes. In addition, where a failure occurs in the dimmer or associated circuit, the whole microscope must be again held in an inverted position in order to permit an examination of the individual components. In view of the foregoing, it is apparent that there is a need in the prior art for a dimmer which overcomes the inconveniences mentioned above.

SUMMARY OF THE INVENTION

It is therefore an object of the invention to provide a base mount for microscopes which comprises a mount separate from the body of an associated microscope and fixedly attached thereto for mounting electrical components thereon which constitute the dimmer, thereby facilitating the assembling in mass production and servicing of the dimmer.

In accordance with the invention, only the mount need be handled when assembling or servicing the dimmer. The mount may be removed from the body of the associated microscope and placed on a work table, and the whole assembling or servicing operation of the electrical components can be made on the work table, which greatly facilitates such operation. Since the mount is substantially complete with the required electrical components when it is to be attached to the base of the associated microscope, the attachment becomes a simple operation and the likelihood of damaging the body or base of the microscope is minimized. It is also contemplated that a microscope may require several different voltage ratings for the dimmer depending on local requirements. The use of the mount according to the invention allows an easy replacement of dimmers each including electrical components of different ratings.

DETAILED DESCRIPTION OF A PREFERRED EMBODIMENT

Figure 1:
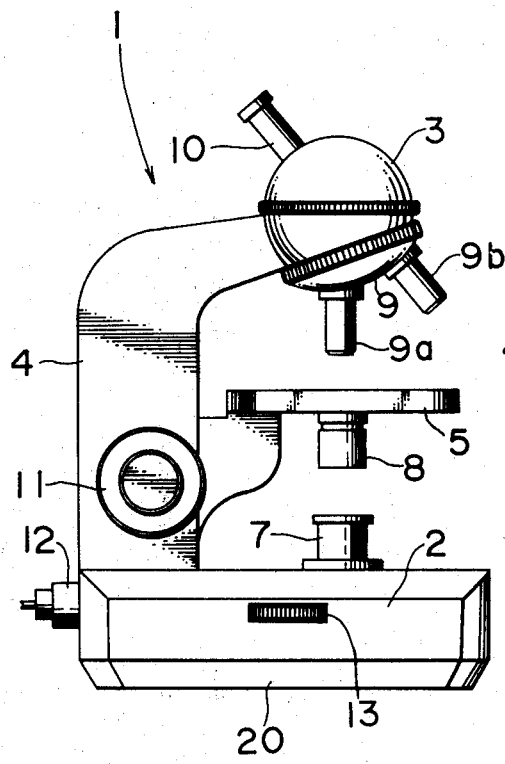
FIG. 1 is a side elevation of a microscope to which the invention is applied.
Figure 2:
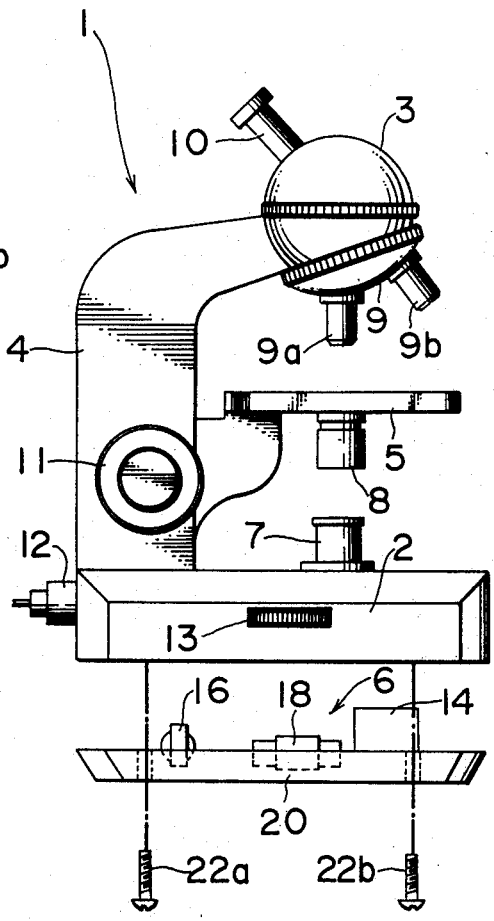
FIG. 2 is a similar view of the microscope, with the mount being removed from the body of the microscope to illustrate the assembling operation.

FIGS. 1 and 2 show a microscope to which the invention is applied. The body of the microscope is generally shown at 1, and essentially includes a base 2 and a lens barrel 3 connected together by a limb portion 4, to which a slidable stage 5 is attached.

Located within the base 2 is a dimmer 6 (see FIG. 2) which is electrically connected with an internally mounted light source assembly, not shown, through a cable connector 12 and which emits and directs through an internally housed optical system a light beam of an adjusted intensity through a projector lens 7 toward a condenser lens 8 mounted underneath the stage 5. A specimen to be examined (not shown) is placed on the stage 5, and can be observed, upon illumination through the condenser lens 8, through an objective lens 9a on a turret 9 which is mounted on the lens barrel 3 and through an eyepiece 10. During the observation, the stage 5 can be moved vertically for the purpose of focussing by turning an operating knob 11 on a limb portion 4. Magnification can be varied by rotating the turret 9, replacing the objective lens 9a by another objective lens 9b.

A tray-shaped mount 20 for mounting electrical components is fixedly attached to the lower portion of the base 2 by means of screws 22a, 22b (FIG. 2), and carries the components such as transformer 14, choke coil 16, thyrister, such as SCR 18, etc., and the like, of a known dimmmer circuit 6. A voltage adjusting knob 13 for manually adjusting the voltage supplied to the light source is mounted on the base 2 and connected to other components of circuit 6 by conventional means, such as the elongated connecting leads 13a and 13b.

When the microscope is assembled, the body 1 is assembled separately while the electrical components of a selected known dimmer circuit, including parts 14 to 18, are mounted on the mount 20. After assembly of the body 1, the mount 20 carrying the assembled electrical components is fixedly attached to the base 2 by suitable means such as screws 22a, 22b, for example.

What is claimed is:

1. A microscope assembly comprising:
    lens barrel means;
    a base for supporting said barrel means;
    the underside of the base having a recess;
    a tray-shaped component mounting member having a flat central portion and upwardly sloping sides defining a tray-shaped recess;
    said mounting member having spaced openings for loosely receiving threaded fasteners;
    said base being adapted to be positioned upon said mounting member whereby said recess and the top surface of said mounting member cooperatively define a hollow substantial rectangular shaped enclosed volume;
    said base having openings aligned with the openings in said component mounting member and being threadedly engaged by said fasteners to secure said mounting member to the bottom of said base;
    said interior volume being of a size sufficient to fully enclose all of the electrical elements typically incorporated in a dimmer circuit conventionally employed for adjusting the intensity of a light source employed as an illumination means in the microscope;

said base having a first opening along the exterior surface communicating with said recess;

a voltage adjusting knob extending at least partially through said opening for manually adjusting the voltage supplied to the light source;

a second opening being provided in said base and communicating with said recess;

a cable connector extending through said second opening and into said interior volume;

the upper surface of the center portion of said tray-shaped component mounting member being adapted to support at least some of the electrical components typically utilized in a dimmer circuit, said components including at least a transformer and a thyristor being mounted upon said center portion to thereby facilitate maintenance, repair, inspection, and/or replacement of said components when the component mounting member is separated from said base whereby said selected components are freely accessible from the top surface of the component mounting member;

the bottom surface of said component mounting member serving as the supporting surface of the microscope assembly when secured to said base;

said interior volume being the sum of said base recess and said tray-shaped recess.

2. The microscope assembly of claim 1, wherein the components mounted upon the tray-shaped component mounting member further include at least one choke coil.

* * * * *